United States Patent
Sevindik

(10) Patent No.: US 11,510,219 B1
(45) Date of Patent: Nov. 22, 2022

(54) BEAM DESIGN TO MITIGATE INTERFERENCE AT CELL EDGES FOR SHARED SPECTRUM SYSTEMS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 17/466,463

(22) Filed: Sep. 3, 2021

(51) Int. Cl.
*H04W 72/12* (2009.01)
*H04W 16/14* (2009.01)
*H04B 7/0404* (2017.01)
*H04B 7/024* (2017.01)
*H04W 52/36* (2009.01)

(52) U.S. Cl.
CPC ........ *H04W 72/1231* (2013.01); *H04B 7/024* (2013.01); *H04B 7/0404* (2013.01); *H04W 16/14* (2013.01); *H04W 52/365* (2013.01)

(58) Field of Classification Search
CPC .................. H04W 72/1231; H04W 52/365
See application file for complete search history.

(56) References Cited

U.S. PATENT DOCUMENTS

| 6,993,361 B2 | 1/2006 | Chitrapu | |
| 2020/0187133 A1* | 6/2020 | Syed | H04W 52/365 |

FOREIGN PATENT DOCUMENTS

WO 2016192533 A1 12/2016

\* cited by examiner

*Primary Examiner* — Sulaiman Nooristany
(74) *Attorney, Agent, or Firm* — Young Basile Hanlon & MacFarlane, P.C.

(57) ABSTRACT

Methods and systems for citizens broadband radio service (CBRS) device (CBSD) interference management is described. A method for managing shared spectrum network interference includes determining, by a Citizens Broadband Radio Service (CBRS) device (CBSD) granted shared spectrum by a spectrum access system (SAS), a number of mobile devices in a defined number of regions in a cell covered by the CBSD, assigning, by the CBSD, a greater number of antennas to a cell edge region from the defined number of regions than a remaining regions in the defined number of regions, and assigning, by the CBSD, at least 8 antennas to each mobile device of a defined number of mobile devices of the number of mobile devices in the cell edge region to transmit non-overlapping and directive beams to mitigate interference at the cell edge region.

17 Claims, 5 Drawing Sheets

BEAM DESIGN TO MITIGATE INTERFERENCE AT CELL EDGES FOR SHARED SPECTRUM SYSTEMS

TECHNICAL FIELD

This disclosure relates to wireless communications. More specifically, using beam design for interference management in shared spectrum systems.

BACKGROUND

Wireless telecommunications or radio access technologies (RATs) can use shared radio frequency spectrum for communications between mobile devices and wireless telecommunications networks. For example, licensed spectrum is used for third generation (3G), fourth generation (4G), and fifth generation (5G) wireless communications.

Citizens Broadband Radio Service (CBRS) spectrum is a type of unlicensed spectrum or shared radio frequency spectrum which is shared between multiple entities including government users (such as the military), licensed users, and non-licensed users. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference limited network which means that the performance of the network and the data sent to CBRS subscribers is limited by the amount of interference the CBRS users or subscribers experience in the frequency band of operation.

Performance of a service provider network using CBRS spectrum is affected by the amount of interference the CBRS users or subscribers experience in the frequency band of operation. Proactive interference management by service providers is needed to avoid service interruption or lose of coverage.

SUMMARY

Disclosed herein are methods and systems for interference management at a base station. A method for managing shared spectrum network interference includes determining, by a Citizens Broadband Radio Service (CBRS) device (CBSD) granted shared spectrum by a spectrum access system (SAS), a number of mobile devices in a defined number of regions in a cell covered by the CBSD, assigning, by the CBSD, a greater number of antennas to a cell edge region from the defined number of regions than a remaining regions in the defined number of regions, and assigning, by the CBSD, at least 8 antennas to each mobile device of a defined number of mobile devices of the number of mobile devices in the cell edge region to transmit non-overlapping and directive beams to mitigate interference at the cell edge region.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
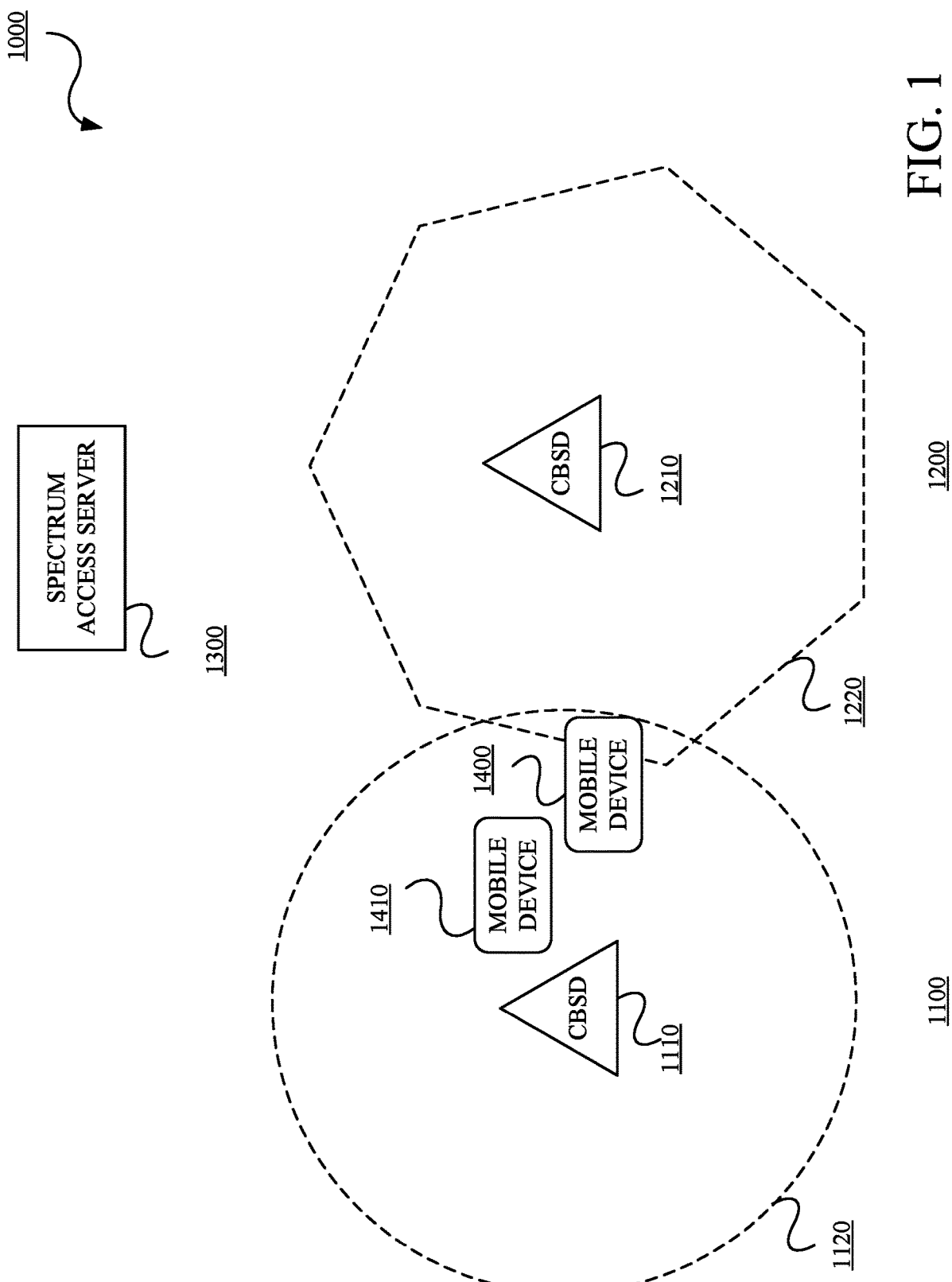
FIG. 1 is a diagram of an example of a citizens broadband radio service (CBRS) system in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for interference management at a shared spectrum base station. In implementations, the shared spectrum may be a Citizens Broadband Radio Service (CBRS) spectrum which is controlled or managed by a spectrum access system (SAS). The shared spectrum base station can use a combination of antenna assignment, spatial diversity, and time diversity based on mobile device distribution and mobile device density to generate or form a beam for a mobile device at a cell edge in a non-interfering manner from a point of view of the SAS. The method may improve user experience when using the CBRS spectrum for connectivity and communications. For example, this may prevent a CBRS device (CBSD) from being dropped by the SAS.

In implementations, a shared spectrum base station can form and transmit independent non-overlapping beams at or below a shared spectrum transmission power threshold. That is, for a mobile device, one highly directed beam can be formed using more than four (4) of the antennas available on the shared spectrum base station. The highly directed beam can be transmitted at high power levels but due to its narrow beamwidth creates less interference to neighboring shared spectrum networks. As such, the beam is substantially invisible or negligible in terms of interference as viewed by the SAS. In implementations, the number of antennas can be increased when the density of mobile devices at the cell edge is high. High density meaning that the number of beams needed for the number of mobile devices at the cell edge can result in interference levels noticeable by the SAS. Usage of additional antennas to generate the beams can reduce the level of interference due to increasingly narrower bandwidth beams. That is, presenting a non-localized interference pattern with respect to the SAS.

In implementations, a shared spectrum base station can determine a number of mobile devices in each of a number of regions by checking power headroom reports sent by the mobile devices. The shared spectrum base station can assign a number of antennas to each of the regions based on the number of mobile devices. The number of antennas can be re-assigned based on SAS messages, change in the number of mobile devices in a region, or combinations thereof.

In implementations, antenna configurations and power resources of a shared spectrum base station can be used to manage interference in a CBRS network.

FIG. 1 is a diagram of an example architecture 1000 for CBRS network interference management. In an implementation, the architecture 1000 can include a first CBRS network 1100 and a second CBRS network 1200. The first CBRS network 1100 can include a CBSD 1110 which may provide wireless or cell coverage 1120. The second CBRS network 1200 can include a CBSD 1210 which may provide wireless or cell coverage 1220. The number of CBRS networks, the number of CBSDs in a CBRS network, and the wireless coverage is illustrative and the architecture 1000 may include more or less networks, each network may include more or less CBSDs, and the wireless coverage can be any profile. The architecture 1000 may include a SAS 1300 which is connected to or in communication (collectively "in communication with") with each of the CBSDs 1100 and 1200. A mobile device 1400 and a mobile device 1410 can be in communication with one of the CBSDs 1100 and 1200. The communications between the mobile device 1400 and the mobile device 1410, particular CBSDs 1100 and 1200, and the SAS 1300 can include wired communications, wireless communications, or a combination thereof. In an implementation, the architecture 1000 may execute the techniques described in FIG. 5. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The CBSDs 1100 and 1200 may be a base station, an access point, an access node or like device which enables radio communications access between, for example, the mobile device 1400 and the mobile device 1410 to other devices. Each CBSD 1100 and 1200 can be authorized and granted spectrum allocation by the SAS 1300.

Figure 2:
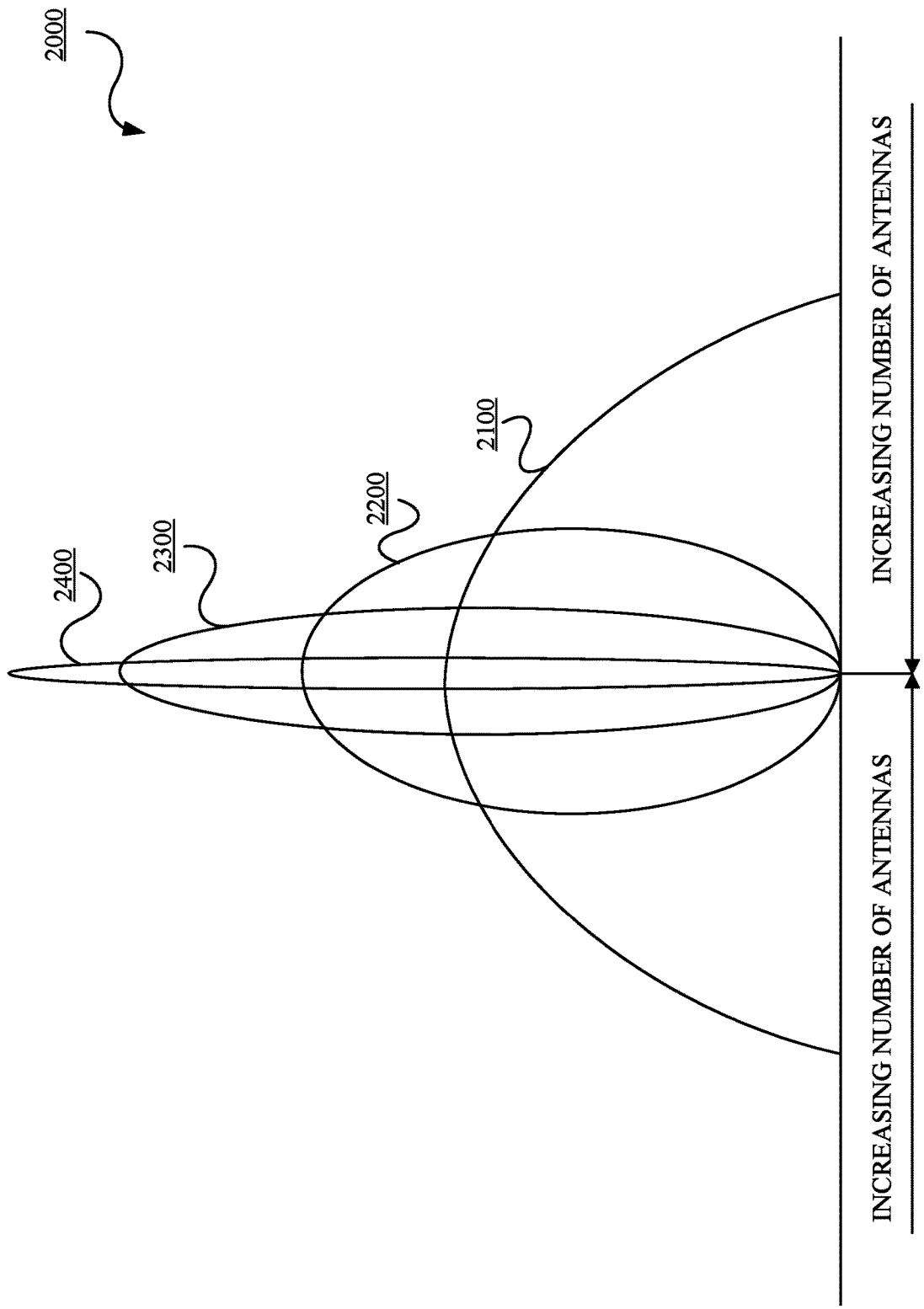
FIG. 2 is an example of beams with increasing antennas in accordance with embodiments of this disclosure.

In implementations, the CBSDs 1100 and 1200 can be part of a service provider system or multiple systems operator (MSO) which provides connectivity and content to the mobile device 1400 and the mobile device 1410, for example. In implementations, the CBSDs 1100 and 1200 can be operated via or under a mobile virtual network operator (MVNO) which provides connectivity and content to the mobile device 1400 and the mobile device 1410, for example. In implementations, the CBSDs 1100 and 1200 can be owned and operated by the same MSOs or MVNOs. In implementations, the CBSDs 1100 and 1200 can be owned and operated by different MSOs or MVNOs. Each of the CBSDs 1100 and 1200 can implement or use beamforming and beam steering along with massive multiple-input/multiple-out (MIMO) technology (collectively "beamforming technology") as specified for 5G wireless communications. with as. In implementations, the CBSDs 1100 and 1200 can have eight (8) or more antennas, 100s of antennas, or more. The CBSDs 1100 and 1200 can use the beamforming technology to generate a beam which is much narrower, enabling the CBSDs 1100 and 1200 to transmit radio frequency (RF) energy to the mobile devices 1400 and 1410, for example, more directly and efficiently. The greater the number of antennas used to form the beam, the narrower the beam as shown in FIG. 2, which illustrates different main lobes for beams 2000. For example, the main lobes for beams 2100, 2200, 2300, and 2400 are increasingly narrower the number of beams increases from 1, 4, 8, and 16, respectively.

The mobile device 1400 and the mobile device 1410 can be, but is not limited to, Internet of Thing (IoT) devices, sensors, end user devices, cellular telephones, Internet Protocol (IP) devices, mobile computers, laptops, handheld computers, personal media devices, smartphones, notebooks, notepads, and the like can be provisioned for operation with a MSO, MVNO, or other like service provider.

The SAS 1300 enables access to the CBRS spectrum and dynamically manages the spectrum for optimal use, efficiency, and compliance with CBRS rules. The SAS 1300 communicates with each CBSD for registration, grant allocation/deallocation and interference management. The SAS 1300 can perform interference analysis based on the power measurements received from mobile device(s) and make allocation and deallocation decisions based on the interference. The SAS 1300 may be operated be a commercial, federal entity, or some combination thereof.

In typical 5G networks, at least one beam is created for each mobile device in the network. A beam is created using at least four (4) antennas. For example, if there are 100 antennas on a CBSD, then the CBSD can create at most 25 beams at the same time to service 25 mobile devices if only one beam is dedicated to each mobile device. If there are 2 beams dedicated to each mobile device, then only 12 mobile devices can be served at the same time. Assigning a different number of beams to each mobile device has drawbacks in terms of interference, especially for mobile devices at a cell edge. For example, a SAS grants spectrum to a CBSD 1110 and 1210, which can transmit 47 dBm of total power for every 10 MHz of spectrum dedicated to the CBSD 1110 and 1210, respectively. If more than one beam is assigned to a cell edge mobile device, such as for example mobile device 1400, by the CBSD 1110, for example, then the total power of these beams might go above the interference limit or transmit power threshold, i.e., with respect to a neighbor network, such as for example CBRS network 1200. In this instance, the SAS 1300, for example, can deallocate the CBSD 1110, resulting in loss of coverage 1120.

Interference management by the CBSDs can be used to decrease the chance of a CBSD from being deallocated. A CBSD, for example, CBSD 1110, can determine the number of mobile devices in different regions based on power headroom reports received from each mobile device in communication with the CBSD 1110. The regions can include a cell edge, a cell middle, and a cell near relative to the location of the CBSD. The number of regions can be more without departing from the scope of the claims and specification. The power headroom reports include reported values ranging from 0 to 63, for example. The CBSD 1110 can identify a mobile device with a power headroom value of 0 as being on the cell edge, identify a mobile device with a power headroom value from 3 to 5 as being on the cell middle, and identify a mobile device with a power headroom value of 6 and greater as being on the cell near.

If a CBSD has N antennas, the CBSD 1110 can assign $N_1$ antennas to a defined number of the mobile devices on the cell edge and assign $N_2$ antennas to the mobile devices on the cell middle and cell near, where $N_1$ is greater than $N_2$. For example, the defined number of mobile devices can be ½ the mobile devices identified at the cell edge. For example, the defined number of mobile devices can be dependent on the total number of mobile devices at the cell edge, location proximity, or combinations thereof. Initially each of the defined number of mobile devices at the cell edge can be assigned 8 antennas for beam generation and each of the mobile devices at the cell middle and cell near can be assigned 4 antennas for beam generation subject to the total number of antennas N and the distribution of the antennas.

In the event that the SAS 1300 may attempt to power down the CBSD (i.e., based on transmitting or determining that more than 47 dB of power will be transmitted in an area), the CBSD can assign more antennas to each of the defined number of mobile devices at the cell edge. For example, the CBSD can assign 16 antennas to each of the defined number of mobile devices. As shown in FIG. 2, the beams will become narrower, non-overlapping, and present less interference from the perspective of the SAS.

In addition, the defined number of mobile devices which use 8 or more antennas can be increased by re-assigning antennas from the antennas assigned to the mobile devices at the cell middle and cell near.

In implementations, the CBSDs can use spatial or location diversity to select mobile devices at the cell edge which are geographically separated to appear as non-localized interference to the SAS.

In implementations, the CBSDs can use time or temporal diversity to schedule transmissions at different times to appear as non-localized interference to the SAS.

In implementations, the CBSDs can use combinations of the above techniques to non-localize interference to mitigate the chances of the SAS deallocating the CBSD. Consequently, the CBSD, by proactively determining transmission powers, can generate narrower beams to present less interference.

In the event that the above techniques are successful, then the CBSDs can gradually lower the number of antennas dedicated to each mobile device at the cell edge and increase the number of antennas assigned to mobile devices in the cell middle and cell near.

Figure 3:
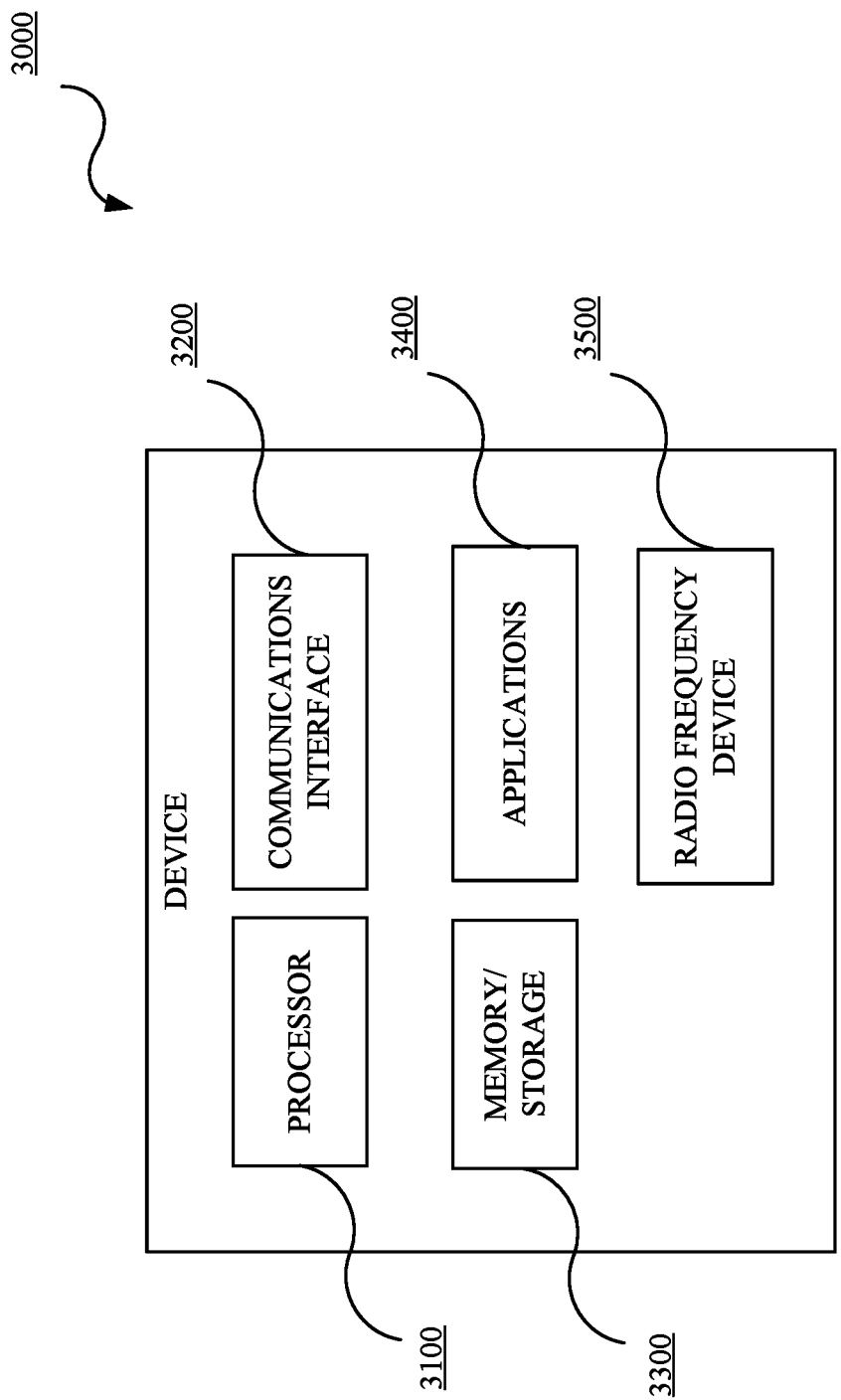
FIG. 3 is a block diagram of an example of a CBRS device (CBSD) in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, applications 3400, and a radio frequency device 3500. The device 3000 may include or implement, for example, any of the CBSDs 1110 and 1210 and the mobile devices 1400 and 1410. In an implementation, the memory/storage 3200 may store the number of mobile devices in each region. The radio frequency device 3500 can include a number of antennas. The applicable or appropriate CBRD interference management techniques or methods described herein may be stored in the memory/storage 3200 and executed by the processor 3100 in cooperation with the memory/storage 3200, the communications interface 3300, the applications 3400, and the radio frequency device 3500 as appropriate. The device 3000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 4:
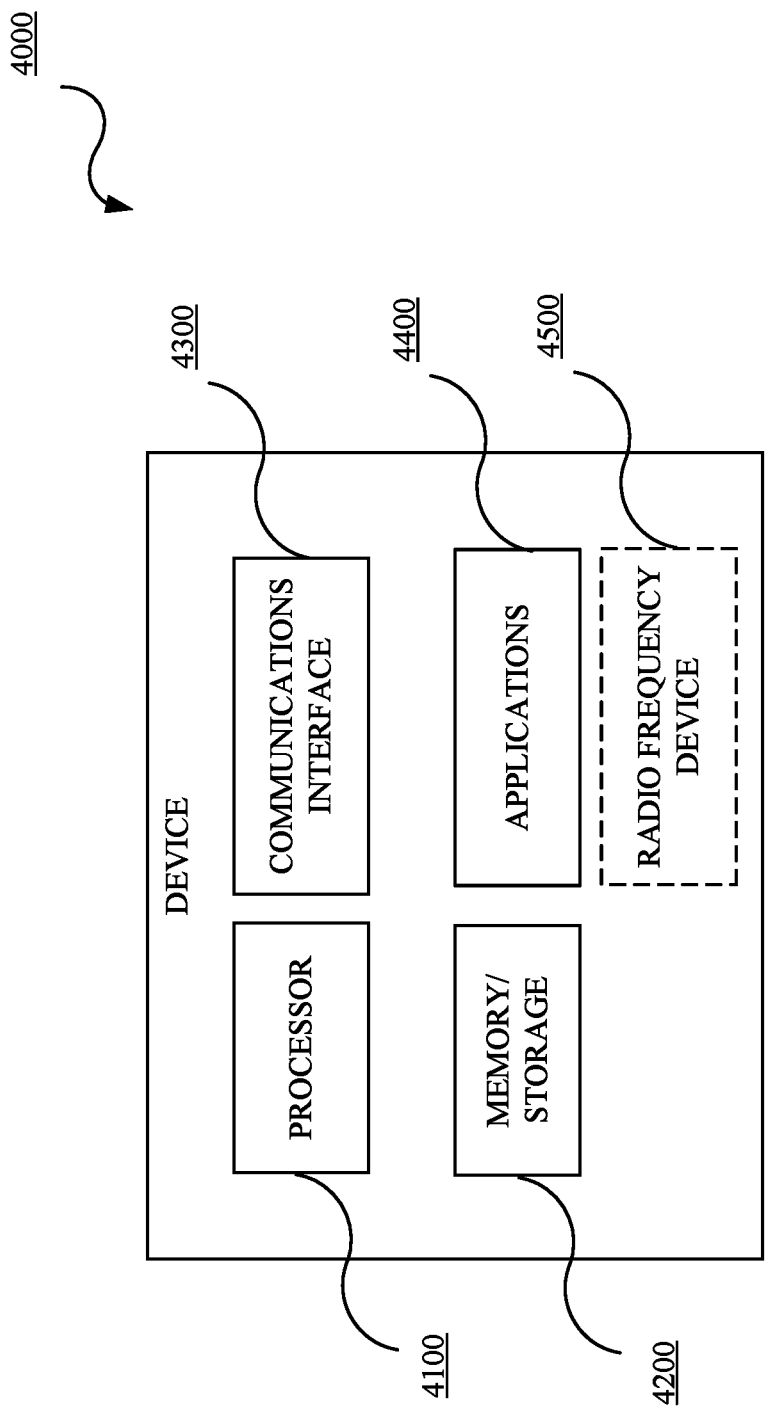
FIG. 4 is a block diagram of an example of a device in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, and applications 4400. In an implementation, the device 4000 may include a radio frequency device 4500. The device 4000 may include or implement, for example, the SAS 1300. In an implementation, the memory/storage 4200 may store the interference map, spectrum allocations, and other information. SAS interference management techniques or methods described herein may be stored in the memory/storage 4200 and executed by the processor 4100 in cooperation with the memory/storage 4200, the communications interface 4300, the applications 4400, and the radio frequency device 4500 (when applicable) as appropriate. The device 4000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 5:
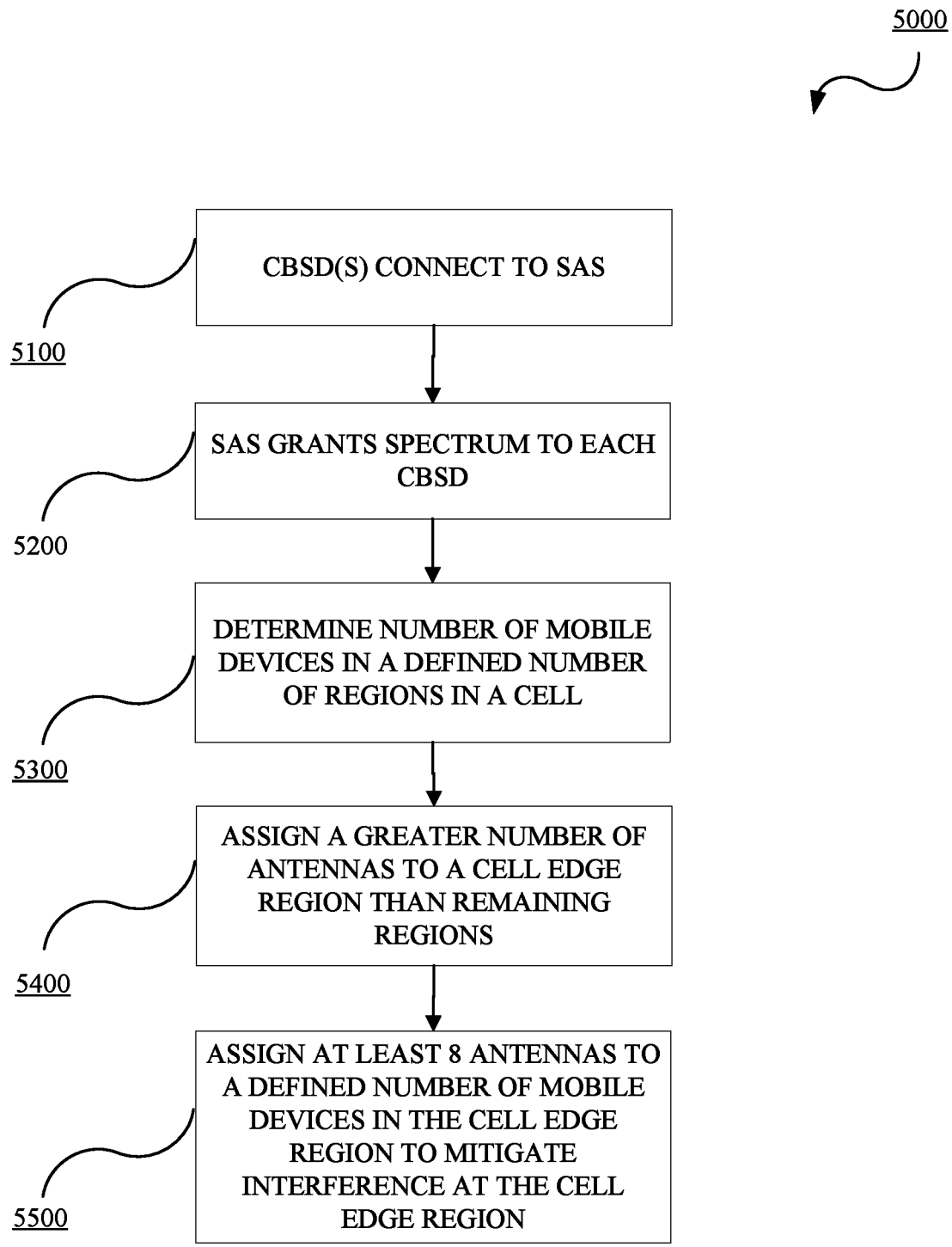
FIG. 5 is a flowchart of an example method for CBRS network interference management using a CBSD in accordance with embodiments of this disclosure.

FIG. 5 is a flowchart of an example method 5000 for CBSD interference management in accordance with embodiments of this disclosure. The method 5000 includes: connecting 5100 CBSD(s) to a SAS; granting 5200 CBRS spectrum to each CBSD; determining 5300 number of mobile devices in a defined number of regions in a cell; assigning 5400 a greater number of antennas to a cell edge region than remaining regions; and assigning 5500 at least 8 antennas to a defined number of mobile devices in the cell edge region to mitigate interference at the cell edge region. For example, the technique 5000 may be implemented, as applicable and appropriate, by a CBSD such as the CBSDs 1110 and 1210 of FIG. 1, the SAS 1300 of FIG. 1, the processor 3100 of FIG. 3, and the processor 4100 of FIG. 4.

The method 5000 includes connecting 5100 CBSD(s) to a SAS and granting 5200 CBRS spectrum to each CBSD. CBSDs can power on and establish connections with the SAS. The SAS can then assign a shared spectrum to each of the CBSDs.

The method 5000 includes determining 5300 number of mobile devices in a defined number of regions in a cell. A cell or cell coverage area of the CBSD can divided up into a number of regions. For example, the regions can be identified as cell edge, cell middle, and cell near. The CBSD can determine the number of mobile devices in each region. The CBSDs can use power headroom reports from the mobile devices to determine and count the number of mobile devices in a region.

The method 5000 includes assigning 5400 a greater number of antennas to a cell edge region than remaining regions. The CBSD can assign a number of antennas to each region based on the number of mobile devices, a default configuration, or combinations thereof.

The method 5000 includes assigning 5500 at least 8 antennas to a defined number of mobile devices in the cell edge region to mitigate interference at the cell edge region. A defined number of the mobile devices in a cell edge region can be assigned 8 antennas based on the number of mobile devices, a default configuration, or combinations thereof. The remaining mobile devices can be assigned at least 4 antennas. The CBSD can assign more antennas to each mobile device depending on power transmission levels, potential power transmission levels, interference levels or potential interference levels. For example, mobile devices assigned with 8 antennas can be assigned 16 antennas and mobile devices assigned with 4 antennas can be assigned 8 antennas. The CBSD can increase the value of the defined number of mobile devices so that a greater number of the mobile devices have 8 or more antennas. The CBSD can use spatial diversity to spread out beam transmission locations. The CBSD can use time diversity to spread out beam transmission times at a location. The CBSD can use combinations of spatial diversity and time diversity to spread out beam transmission locations and beam transmission times at the beam transmission locations.

The description herein describes a method for managing shared spectrum network interference. The method includes determining, by a Citizens Broadband Radio Service (CBRS) device (CBSD) granted shared spectrum by a spectrum access system (SAS), a number of mobile devices in a defined number of regions in a cell covered by the CBSD, assigning, by the CBSD, a greater number of antennas to a cell edge region from the defined number of regions than a remaining regions in the defined number of regions, and assigning, by the CBSD, at least 8 antennas to each mobile device of a defined number of mobile devices of the number of mobile devices in the cell edge region to transmit non-overlapping and directive beams to mitigate interference at the cell edge region.

The method further includes assigning, by the CBSD, 4 antennas to each mobile device in the remaining regions.

The method further includes assigning, by the CBSD, 4 antennas to each remaining mobile device in the cell edge region. The method further includes receiving, by the CBSD from mobile devices in the cell, power headroom reports, and using, by the CBSD, a value in the power headroom report to indicate an appropriate region from the defined number of regions. The method further includes assigning, by the CBSD, more antennas to each mobile device with 8 antennas to mitigate the interference at the cell edge region. The method further includes assigning, by the CBSD, more antennas to each mobile device with 4 antennas to mitigate the interference at the cell edge region. The method further includes using, by the CBSD, spatial diversity to select geographically separated mobile devices to mitigate the interference at the cell edge region. The method further includes using, by the CBSD, time diversity to schedule transmissions at different times to a location to mitigate the interference at the cell edge region. The method further includes using, by the CBSD, a combination of spatial diversity and time diversity to schedule transmissions to mitigate interference at the cell edge region.

The description herein describes a Citizens Broadband Radio Service (CBRS) device (CBSD). The CBSD includes a plurality of antennas and a processor. The processor is configured to receive shared spectrum allocation from a spectrum access system (SAS), receive power headroom reports from mobile devices in a coverage area of the CBSD, determine distribution of mobile devices located at an edge of the coverage area and at non-edges of the coverage area, unevenly distribute antenna assignments between mobile devices at the edge and mobile devices at the non-edge mobile based on the distribution of the mobile devices, and assign 8 antennas from the plurality of antennas to each mobile device of a certain percentage of mobile devices located at the edge of the coverage area to transmit non-overlapping and directive beams to mitigate interference at the edge of the coverage area.

The processor is further configured to assign 4 antennas from the plurality of antennas to each mobile device of a remaining percentage of mobile devices at the edge of the coverage area and assign 4 antennas from the plurality of antennas to each mobile device at the non-edges of the coverage area. The processor is further configured to assign 16 antennas from the plurality of antennas to each mobile device at the edge with 8 antennas to mitigate increased interference at the edge and assign 8 antennas from the plurality of antennas to each mobile device at the edge with 4 antennas to mitigate the increased interference at the edge. The processor is further configured to perform at least one of spatial diversity to select geographically separated mobile devices to mitigate the interference at the cell edge region and time diversity to schedule transmissions at different times to a location to mitigate the interference at the cell edge region.

The description herein describes a method for managing shared spectrum network interference. The method includes determining, by a shared spectrum base station for a coverage area, a number of mobile devices at an edge area, a number of mobile devices at a middle area, and a number of mobile devices at a near area, associating, by the shared spectrum base station, N antennas to the edge area and M antennas to the middle area plus the near area, wherein N is greater than M, and associating, by the shared spectrum base station, at least 8 antennas of the N antennas to each mobile device in a subset of the number of mobile devices at the edge area to transmit non-overlapping and directive beams to mitigate interference at the edge area.

The method further includes receiving, by the shared spectrum base station from mobile devices in the coverage area, power headroom reports and using, by the shared spectrum base station, a value in the power headroom report to indicate one of the edge area, the middle area, and the near area. The method further includes associating, by the shared spectrum base station, 16 antennas to each mobile device which have 8 antennas assigned to mitigate the interference at the cell edge region. The method further includes associating, by the shared spectrum base station, 8 antennas to each mobile device with 4 antennas to mitigate the interference at the edge area. The method further includes using, by the shared spectrum base station, spatial diversity to select geographically separated mobile devices to mitigate the interference at the edge area. The method further includes using, by the shared spectrum base station, time diversity to schedule transmissions at different times to a location to mitigate the interference at the edge area. The method further includes using, by the shared spectrum base station, a combination of spatial diversity and time diversity to schedule transmissions to mitigate the interference at the edge area.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for managing shared spectrum network interference, the method comprising:
   determining, by a Citizens Broadband Radio Service (CBRS) device (CBSD) granted shared spectrum by a spectrum access system (SAS), a number of mobile devices in a defined number of regions in a cell covered by the CBSD;
   assigning, by the CBSD, a greater number of antennas to a cell edge region from the defined number of regions than a remaining regions in the defined number of regions;
   assigning, by the CBSD, at least 8 antennas to each mobile device of a defined number of mobile devices of the number of mobile devices in the cell edge region to transmit non-overlapping and directive beams to mitigate interference at the cell edge region;
   assigning, by the CBSD, 4 antennas to each mobile device in the remaining regions; and
   assigning, by the CBSD, 4 antennas to each remaining mobile device in the cell edge region.

2. The method of claim 1, the method further comprising:
   receiving, by the CBSD from mobile devices in the cell, power headroom reports; and
   using, by the CBSD, a value in the power headroom report to indicate an appropriate region from the defined number of regions.

3. The method of claim 2, the method further comprising:
   assigning, by the CBSD, more antennas to each mobile device with 8 antennas to mitigate the interference at the cell edge region.

4. The method of claim 3, the method further comprising:
   assigning, by the CBSD, more antennas to each mobile device with 4 antennas to mitigate the interference at the cell edge region.

5. The method of claim 4, the method further comprising:
   using, by the CBSD, spatial diversity to select geographically separated mobile devices to mitigate the interference at the cell edge region.

6. The method of claim 5, the method further comprising:
   using, by the CBSD, time diversity to schedule transmissions at different times to a location to mitigate the interference at the cell edge region.

7. The method of claim 4, the method further comprising:
   using, by the CBSD, a combination of spatial diversity and time diversity to schedule transmissions to mitigate interference at the cell edge region.

8. A Citizens Broadband Radio Service (CBRS) device (CBSD) comprising:
   a plurality of antennas; and
   a processor configured to:
      receive shared spectrum allocation from a spectrum access system (SAS);
      receive power headroom reports from mobile devices in a coverage area of the CBSD;
      determine distribution of mobile devices located at an edge of the coverage area and at non-edges of the coverage area;

unevenly distribute antenna assignments between mobile devices at the edge and mobile devices at the non-edge mobile based on the distribution of the mobile devices;

assign 8 antennas from the plurality of antennas to each mobile device of a certain percentage of mobile devices located at the edge of the coverage area to transmit non-overlapping and directive beams to mitigate interference at the edge of the coverage area;

assign 4 antennas from the plurality of antennas to each mobile device of a remaining percentage of mobile devices at the edge of the coverage area; and assign 4 antennas from the plurality of antennas to each mobile device at the non-edges of the coverage area.

9. The CBSD of claim 8, the processor further configured to:

assign 16 antennas from the plurality of antennas to each mobile device at the edge with 8 antennas to mitigate increased interference at the edge; and assign 8 antennas from the plurality of antennas to each mobile device at the edge with 4 antennas to mitigate the increased interference at the edge.

10. The CBSD of claim 9, the processor further configured to perform at least one of:

spatial diversity to select geographically separated mobile devices to mitigate the interference at the cell edge region; and time diversity to schedule transmissions at different times to a location to mitigate the interference at the cell edge region.

11. A method for managing shared spectrum network interference, the method comprising:

determining, by a shared spectrum base station for a coverage area, a number of mobile devices at an edge area, a number of mobile devices at a middle area, and a number of mobile devices at a near area;

associating, by the shared spectrum base station, N antennas to the edge area and M antennas to the middle area plus the near area, wherein N is greater than M;

associating, by the shared spectrum base station, at least 8 antennas of the N antennas to each mobile device in a subset of the number of mobile devices at the edge area to transmit non-overlapping and directive beams to mitigate interference at the edge area;

assigning, by the shared spectrum base station, 4 antennas to each mobile device in the middle area plus the near area; and assigning, by the shared spectrum base station, 4 antennas to each remaining mobile device in the edge area.

12. The method of claim 11, the method further comprising:

receiving, by the shared spectrum base station from mobile devices in the coverage area, power headroom reports; and using, by the shared spectrum base station, a value in the power headroom report to indicate one of the edge area, the middle area, and the near area.

13. The method of claim 11, the method further comprising:

associating, by the shared spectrum base station, 16 antennas to each mobile device which have 8 antennas assigned to mitigate the interference at the edge area.

14. The method of claim 13, the method further comprising:

associating, by the shared spectrum base station, 8 antennas to each mobile device with 4 antennas to mitigate the interference at the edge area.

15. The method of claim 14, the method further comprising:

using, by the shared spectrum base station, spatial diversity to select geographically separated mobile devices to mitigate the interference at the edge area.

16. The method of claim 14, the method further comprising:

using, by the shared spectrum base station, time diversity to schedule transmissions at different times to a location to mitigate the interference at the edge area.

17. The method of claim 14, the method further comprising:

using, by the shared spectrum base station, a combination of spatial diversity and time diversity to schedule transmissions to mitigate the interference at the edge area.

* * * * *